Patented Jan. 26, 1943

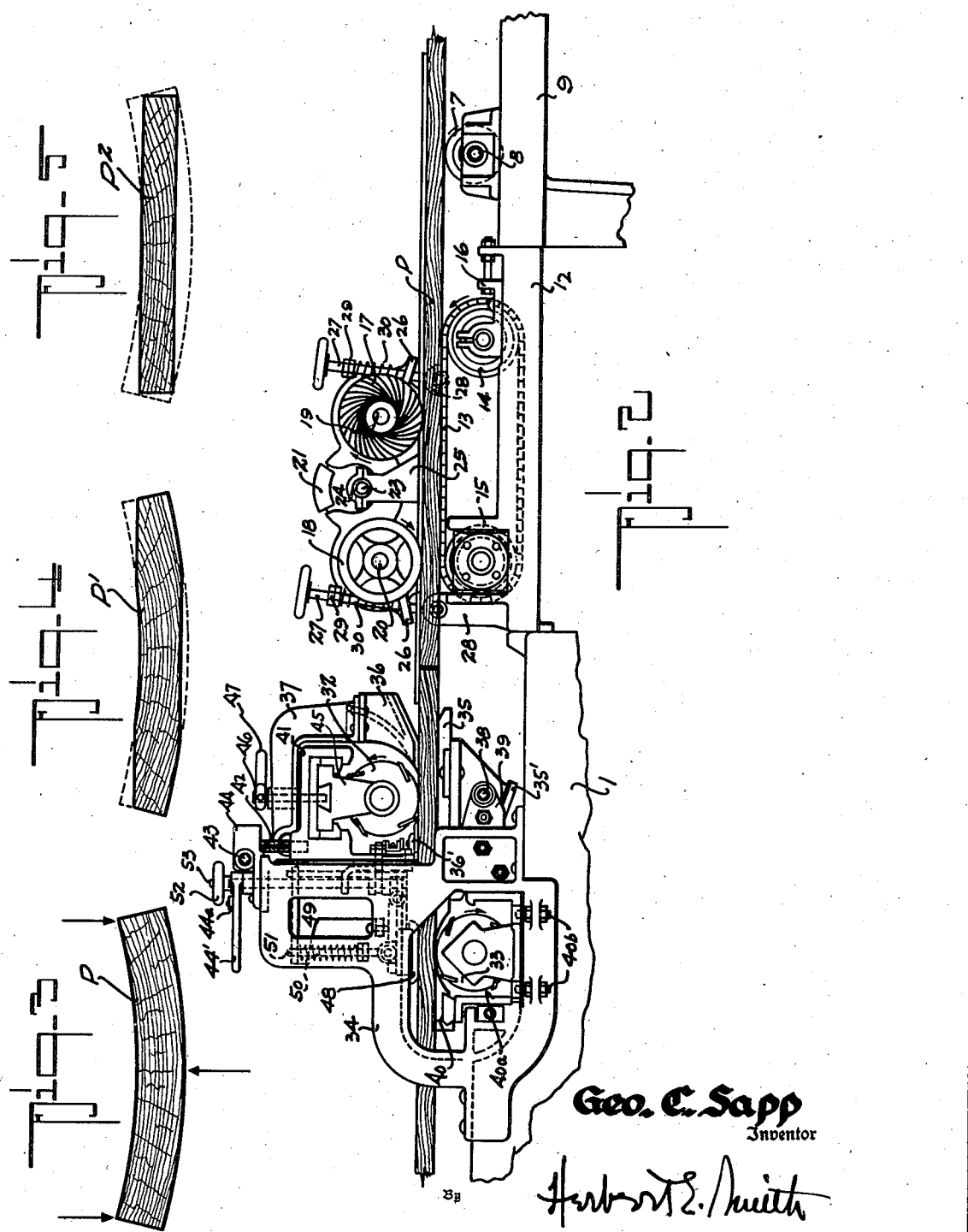

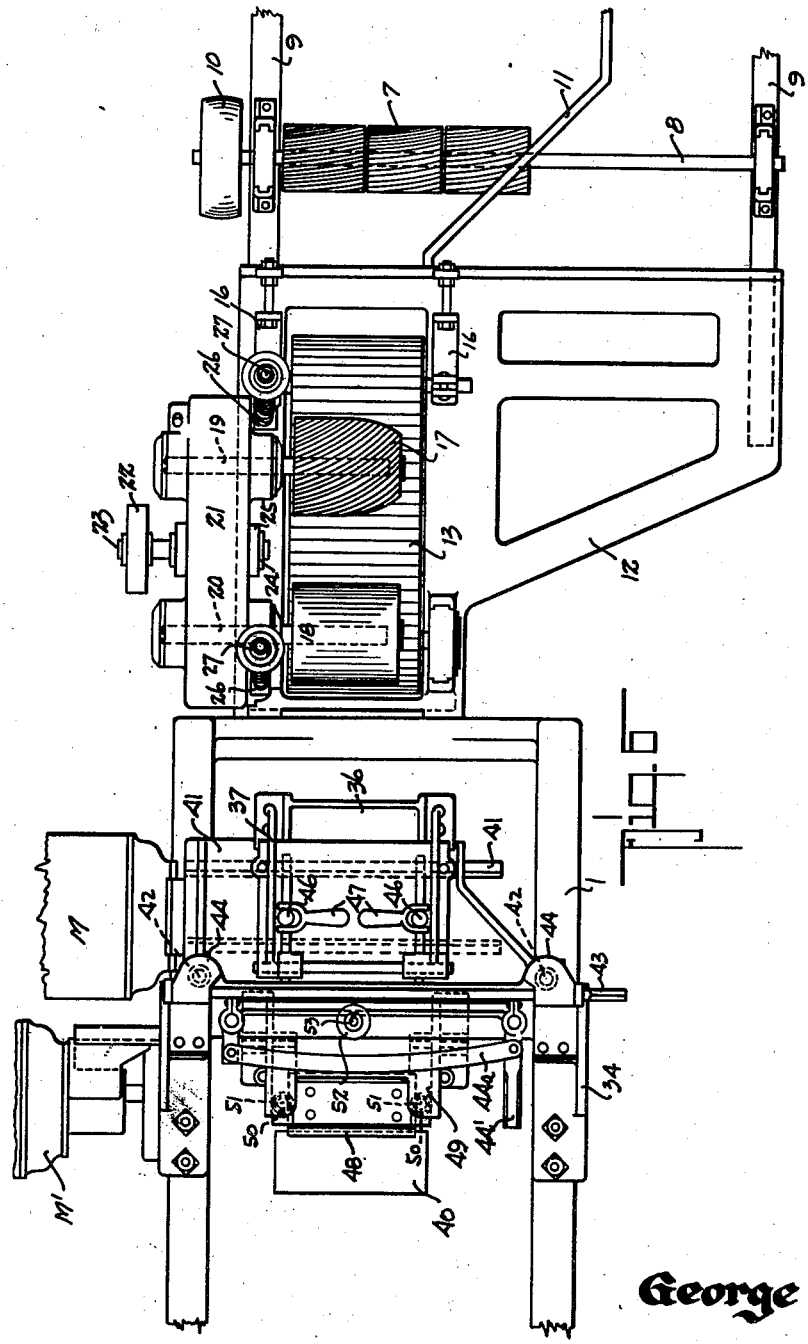

2,309,417

UNITED STATES PATENT OFFICE 2,309,417

WOOD PLANING MACHINE

George C. Sapp, Spokane, Wash.

Application May 18, 1940, Serial No. 336,046

2 Claims. (Cl. 144—116)

My present invention relates to improvements in wood planing machines by means of which a process, involving two operations, is carried out for the purpose of producing a plank having true shape and dimensions, notwithstanding inherent warping in the undressed material from which the dressed board or plank is manufactured, and as a consequence of these two steps or operations in the manufacture of the plank the finished article has a set and fixed grain that is not subject to subsequent warping or distortion. The flat, accurately shaped, and dimensioned plank thus prepared and finished steadfastly maintains, in a permanent manner, its proper condition for use in building construction.

As is well known in the lumber trade, the seasoned rough lumber taken from the lumber-pile, or as coming from the drying kiln, frequently is warped with the grain of the wood, or curved transversely of the oversize material, and such material, when passing through the usual planing machine in an attempt to dress it, is subjected to pressures which frequently split the warped material, or, if the material successfully resists this pressure and is dressed, the plank still remains in its warped condition. Such warped material is of little value, and when used in building construction it must be nailed, or forced in other manner to flattened condition, thus straining the grain of the warped wood with likelihood of splitting.

The purpose of my invention is to remove these objectionable features from the warped rough lumber before it is finished in the usual planing machine, and thereby produce a plank or board in which the grain of the wood may still remain in its warped condition, but the resulting, finished, flat plank has removed therefrom any tendency to further warping or distortion, and without danger of straining to splitting when the plank is nailed in place.

In carrying out my invention the rough, warped lumber is run through the planing machine and thereby subjected to two planing operations, the first of which prepares the lumber by roughly shaping or flattening the top and bottom sides of the warped plank thereby reducing its available thickness, without strains or stresses being applied to the warped material; and then in the second operation of planing, the flattened or prepared lumber is planed on both the top and bottom sides and the opposite edges, in usual manner, to bring the finished plank to its desired dimensions.

In the accompanying drawings I have illustrated my invention as an auxiliary mechanism located at the feed end of a standard planing machine, thus embodying the invention as a unit in the planing machine, whereby the two operations are carried out in close sequence in the same machine.

The machine employed is of the rotary cylindrical cutter type for planing the work as it is moved rectilinearly by means of a flexible conveyor or work-supporting endless-bed of the endless chain type and resilient presser-feed rolls. Means are employed for adjusting the presser-feed mechanism with relation to varying conditions of the warped material or work, and means are also employed for adjusting the upper and lower rotary cylindrical cutters of the auxiliary unit with reference to the path of the work, or the machine frame.

The invention consists in certain steps in the manufacture of the finished product, as a plank or board, and in certain novel combinations and arrangements of parts in the machine by means of which these steps are carried out, as will hereinafter be more fully set forth and claimed.

Figure 2 is an enlarged side elevation of the unit for preliminary planing or preparation of the plank, showing one plank in the feed-bed and a preceding plank passing between the upper and lower planers or rotary cutters.

Figure 3 is a cross section of a warped, rough plank, exaggerated for convenience of illustration, indicating by the two sets of arrows the manner in which force is applied in a usual planing machine that tends to split or crack the plank.

Figure 4 is a view similar to Fig. 3, showing the prepared or shaped, warped plank after it has passed through the auxiliary unit, the dotted lines indicating the material that has been removed by the cutters.

Figure 5 is a transverse sectional view of the finished, dressed plank after it has passed through the two operations of the machine, the dotted lines indicating the original cross sectional shape of the warped material.

Figure 6 is a top plan view of the shaping unit as shown in Figure 2.

Figure 1:
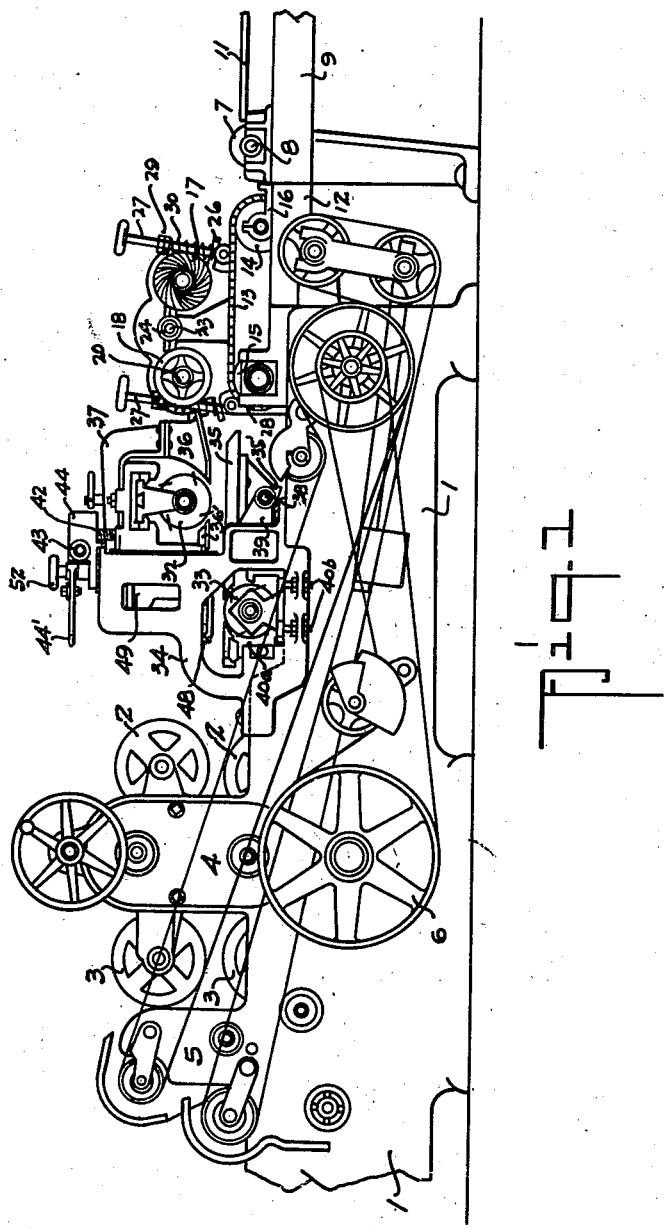
Figure 1 is a side elevation of a standard planing machine with which the auxiliary unit of my invention is embodied.

In order that the general arrangement and relation of parts may readily be understood I have illustrated in Fig. 1 parts of a standard planing machine including the main frame 1, the two pairs of feed-rollers 2, 2, and 3, 3, and the positions of the rotary cutters that operate on the top and bottom sides and the opposite edges of the plank are indicated as back of the frames 4 and 5, together with part of the driving mechanism indicated at 6.

In Figs. 3, 4, and 5, the steps in the process of manufacturing the finished article are graphically illustrated by the rough warped plank P, the flattened or prepared plank P' as it emerges from the auxiliary unit, and the finished plank P2 with its top and bottom sides and opposite edges dressed down to the required dimensions as it emerges from the planing mechanism at the left in Fig. 1. In this manner the upturned side-edges of Fig. 3 are removed from the top of the plank, and the crown of the convex side of the warped plank is also removed, leaving the plank with two flattened portions on its upper face at opposite sides of its longitudinal center, and leaving a flattened portion on the underface along the longitudinal center of the plank, the upper flat faces and the lower flat face being in parallel planes.

In the roughly flattened shape, the plank P' is introduced to the second planing mechanism in such condition as to nullify the pressure applied against the upper and lower faces of plank P', and the warped grain of plank P' is therefore not subjected to splitting or cracking pressure as it is dressed down to the shape and dimensions of the plank P2 of Fig. 5.

In Figure 2 the plank P at the right, is fed first to the shaping or auxiliary unit over the corrugated rollers 7 that are rotatable with shaft 8 journaled in bearings mounted on the feed table 9. The shaft is revolved through the use of drive pulley 10 shown in Fig. 6, and an inclined guide strip 11 is provided to guide the forward end of the plank in the proper direction.

A bed plate 12 is alined with the main frame 1 and upon the plate is mounted the feed mechanism for the plank P, and the upper flight of an endless, flexible, conveyor belt 13, in the form of an endless chain, forms the under feed mechanism for the plank. The endless belt or feed chain passes around the two spaced sprockets 14 and 15 having adjustable bearings, and the belt, which forms a flexible bed that readily adapts itself to the irregularities of the warped plank, may be tensioned by means of a belt-tightener indicated at 16, 16.

Above the flexible conveyor-bed 13, and co-acting therewith to feed the plank P, I arrange two feed rolls 17 and 18, the former known as a "pineapple" roll and mounted on the transversely extending shaft 19, and the latter being a smooth surface roller on shaft 20. These shafts 19 and 20 are journaled in a gear box 21 and driven from pulley 22 through suitable gears in the box, and the feed rolls are revolved clockwise in frictional engagement with the top or upper surface of the plank P as it is being conveyed over its flexible bed 13.

The rolls 17 and 18 form part of a pressure-feed for the plank and the mechanism is resiliently supported in order that the two feed rolls may constantly engage the plank passing beneath them regardless of any irregularities in the top surface of the plank, and the flexible bed 13 beneath the plank is also in constant frictional engagement with the bottom face of the plank regardless of any irregularities on this face.

To aid the resilient pressing effect of the two rollers 17 and 18 the drive shaft 23, on which the pulley 22 is mounted, is pivotally supported in bearings 24 of a bearing bracket 25 rigid with the table 12, and intermediate the shafts 19 and 20.

At the opposite, lower, ends of the gear case 21 are provided lugs 26 having holes to accommodate tension bolts 27, which bolts at their lower ends pass through the holes in the lugs and are hinged or pivoted in brackets 28 rigid with the table 12. The bolts are threaded to receive adjusting nuts 29, and between these nuts and lugs 26, springs 30 are interposed. These springs bear directly upon the lugs, and thus exert tension against the lugs of the gear case, to thereby resiliently hold down the case, and the two feed rollers 17 and 18 upon the upper face of the plank as it is fed to the shaping unit.

An upper cylindrical rotary cutter 32 and a lower cylindrical rotary cutter 33 of the shaping unit are mounted transversely of the plank in an upright frame 34 supported on the main frame 1 of the planing machine, and succeeding planks are fed as indicated in Fig. 2 from the feed-unit to these cutters which remove the material from the upper and lower faces of the plank, as indicated in Fig. 4 by dotted lines. The advancing blank passes over a lower bed plate 35 aligned with the feed conveyor 13, and under an upper front guide shoe 36, the latter guide being supported from the frame 37 of the upper cutter or planer. A second, adjustable shoe 36' located at the rear of the upper cutter 32, bears down upon the upper face of the plank.

The bed plate 35 is adjustably supported beneath the plank and beneath the upper cutter. A screw bolt 38, which is mounted in bracket 39 rigid with the frame 34 raises or lowers plate 35 upon the inclined guides 35' to gauge the depth of the cut taken upon the upper surface of plank P by the revolving cutter 32.

At the rear of the lower planer or cutter, a table 40 is also provided for the plank to glide over as it emerges from the lower planing device. The cutter 33, table 40, and the cutter frame 40a rigid with the table, are vertically adjustable in frame 34 with relation to the plank, by means of adjusting bolts 40b at each side of the machine.

The cutter 32 is mounted in a cutter frame 41, and the latter is vertically adjustable to vary the relation of the cutter to the work or plank by means of a pair of upright screws 42, 42, and the transversely extending screw bar 43, the latter journaled at the top of the machine frame. The screws and screw bar are connected by worms or gears located in the casings 44, and a locking bar 44', and clamp bar 44a are employed to firmly secure the adjusted frame 41 to the frame 34.

The carriage 45 of the cutter 32 is also adjustable transversely of the plank with relation to the vertically adjustable frame 41, to set the cutter in desired relation with the plank, and the carriage is held in this adjusted position by means of locking bolts 46 having pivoted handles 47, and mounted in the frame 37, to engage the carriage.

The pressure shoe 36' at the rear of the upper cutter, and a complementary presser-shoe 48 located directly above the lower cutter, are suspended in a frame 49 having springs 50 and bolts 51 that press these shoes down against the upper face of the plank. The shoe 36' is raised and lowered for adjustment by manipulation of the hand wheel 52, and adjusting screw bars 53 at the center of the frame 34.

Suitable means are provided for operating the cutters, and in Fig. 6 I have illustrated two electric motors M and M′ adapted to operate the respective cutters.

From the above description taken in connection with the drawings it will be apparent that the successive warped planks are fed to the auxiliary unit for the purpose of trimming them to a flattened condition, and both the feed mechanism and the cutting mechanism of this unit are arranged in such manner as to readily adapt themselves to the irregularities of the warped plank in order to avoid application of a splitting or straining pressure to the opposite sides of the warped plank. As the succeeding warped planks are fed to the trimming machine the flattened planks are advanced to the finishing part of the machine, and these flattened planks are fed through, and operated on by the finishing machine, in similar manner to the usual passage of a plank through the standard planing machine.

Having thus fully described my invention what I claim as new and desire to secure by Letters Patent is:

1. In combination with a planing machine including a main frame and a dressing unit having cutters for operating upon upper and lower faces of a plank and reducing the plank to a predetermined thickness and means for feeding the plank between the cutters; an attachment for trimming warped planks and forming parallel upper and lower faces upon the plank prior to delivery of planks to the dressing unit, said attachment comprising an upright frame having side frames mounted upon the main frame at opposite sides thereof forwardly of the dressing unit and a bridge between upper ends of the side frames, a lower cutter rotatably mounted between the side frames, a companion frame in the upright frame suspended from the bridge and vertically adjustable, a presser shoe carried by the companion frame over the lower cutter and urged downwardly, a bed plate carried by and projecting forwardly from the upright frame, castings projecting from upper ends of the side frames, a cutter frame in front of the upright frame, supporting screws for the cutter frame threaded through said castings for vertical adjustment of the cutter frame, an upper cutter rotatably carried by the cutter frame over the bed plate and adjustable transversely thereof, a frame over the cutter frame provided with means for securing the cutter in a transversely set position, and shoes carried by the cutter frame and the last mentioned frame with the upper cutter located between the shoes.

2. In combination with a planing machine including a main frame and a dressing unit having cutters for operating upon upper and lower faces of a plank and reducing the same to a predetermined thickness; an attachment for trimming upper and lower faces of warped planks to form parallel surfaces prior to feeding of planks through the dressing unit comprising an upright frame mounted upon the main frame and extending transversely across the same forwardly of the dressing unit, a lower cutter rotatably carried by the upright frame, a companion frame mounted in the upright frame for vertical adjustment, a presser shoe carried by the companion frame over the lower cutter and urged downwardly, a bed plate extending forwardly from the lower end of the upright frame, a cutter frame in front of the upright frame mounted for vertical adjustment over the bed plate, an upper cutter rotatably carried by the cutter frame, a frame extending forwardly from the upright frame over the cutter frame and downwardly in front thereof, and shoes carried by the cutter frame and the lower end of the downwardly extending portion of the last mentioned frame and positioned on opposite sides of the upper cutter.

GEORGE C. SAPP.